US008656563B2

(12) United States Patent
Hiramatsu et al.

(10) Patent No.: US 8,656,563 B2
(45) Date of Patent: Feb. 25, 2014

(54) STRUCTURE OF INSTALLATION MEMBER TO BE INSTALLED TO VEHICLE OUTER PANEL, AND BOLT RETAINING MEMBER AND ATTACHMENT USED THEREFOR

(71) Applicant: Sakae Riken Kogyo Co., Ltd., Aichi (JP)

(72) Inventors: Makoto Hiramatsu, Aichi (JP); Youji Bitou, Aichi (JP)

(73) Assignee: Sakae Riken Kogyo Co., Ltd., Aichi (JP)

( * ) Notice: Subject to any disclaimer, the term of this patent is extended or adjusted under 35 U.S.C. 154(b) by 40 days.

(21) Appl. No.: 13/672,128

(22) Filed: Nov. 8, 2012

(65) Prior Publication Data
US 2013/0259595 A1    Oct. 3, 2013

(30) Foreign Application Priority Data

Apr. 3, 2012    (JP) ................................. 2012-084834

(51) Int. Cl.
*F16B 39/00*    (2006.01)
*E04C 2/38*    (2006.01)

(52) U.S. Cl.
USPC ............. 24/297; 411/107; 411/372; 411/955; 24/457; 52/716.5; 52/718.01

(58) Field of Classification Search
USPC ......... 411/103, 107, 508–510, 512, 337–339, 411/371.2–372, 955, 965, 985, 993, 997, 411/999; 403/326, 388, 397–399; 24/297, 24/457, 289; 52/716.5–716.6, 718.01, 52/718.02, 718.04, 718.05
See application file for complete search history.

(56) References Cited

U.S. PATENT DOCUMENTS

| | | | | | |
|---|---|---|---|---|---|
| 2,853,113 | A | * | 9/1958 | Balint et al. | 411/103 |
| 4,176,428 | A | * | 12/1979 | Kimura | 24/326 |
| 4,312,165 | A | * | 1/1982 | Mizusawa | 52/511 |
| 4,550,230 | A | * | 10/1985 | Johnson | 181/199 |
| 4,861,208 | A | * | 8/1989 | Boundy | 411/339 |
| 4,907,923 | A | * | 3/1990 | McGrath, Jr. | 411/107 |
| 5,094,580 | A | * | 3/1992 | Abe | 411/553 |
| 5,195,793 | A | * | 3/1993 | Maki | 293/155 |
| 5,353,571 | A | * | 10/1994 | Berdan et al. | 52/716.5 |

(Continued)

FOREIGN PATENT DOCUMENTS

JP    2011-251591 A    12/2011

OTHER PUBLICATIONS

English translation by machine of JP 2011-251591 A.

*Primary Examiner* — Robert J Sandy
*Assistant Examiner* — Tyler Johnson
(74) *Attorney, Agent, or Firm* — McClure, Qualey & Rodack, LLP (57) ABSTRACT

To provide a structure of an installation member to be installed to a vehicle outer panel that can prevent rust from developing on a bolt and an outer panel without requiring resist-coating processing. A structure of an installation member to be installed to a vehicle outer panel includes a metallic retaining portion provided to a rear garnish (installation member) to be installed to a vehicle outer panel in order to install this member to this outer panel, a resin-made attachment to be attached to the retaining portion and having no metallic plating film, and a bolt whose head portion is retained by the attachment, wherein the bolt is integrally incorporated to the retaining portion via the attachment and the rear garnish is installed to the outer panel by using the bolt.

1 Claim, 8 Drawing Sheets

(56) References Cited

U.S. PATENT DOCUMENTS

| | | | |
|---|---|---|---|
| 5,380,325 A * | 1/1995 | Lahille et al. | 606/250 |
| 5,507,610 A * | 4/1996 | Benedetti et al. | 411/339 |
| 5,599,131 A * | 2/1997 | Julen et al. | 403/312 |
| 6,261,042 B1 * | 7/2001 | Pratt | 411/551 |
| 6,431,585 B1 * | 8/2002 | Rickabus et al. | 280/728.3 |
| 6,594,870 B1 * | 7/2003 | Lambrecht et al. | 24/297 |
| 6,715,185 B2 * | 4/2004 | Angellotti | 24/297 |
| 6,796,760 B1 * | 9/2004 | Tanner | 411/107 |
| 6,813,865 B2 * | 11/2004 | Peterson | 52/506.05 |
| 7,152,281 B2 * | 12/2006 | Scroggie | 24/297 |
| 7,165,371 B2 * | 1/2007 | Yoyasu | 52/716.5 |
| 7,549,199 B2 * | 6/2009 | Bugner | 24/297 |
| 7,698,787 B2 * | 4/2010 | Scroggie et al. | 24/297 |
| 7,784,857 B2 * | 8/2010 | Naik et al. | 296/193.1 |
| 7,904,994 B2 * | 3/2011 | Girodo et al. | 24/297 |
| 8,291,553 B2 * | 10/2012 | Moberg | 24/297 |
| 8,322,001 B2 * | 12/2012 | Ehrhardt et al. | 24/289 |
| 8,544,236 B2 * | 10/2013 | Benedetti et al. | 52/716.6 |
| 2003/0230044 A1 * | 12/2003 | Peterson | 52/716.5 |
| 2004/0016088 A1 * | 1/2004 | Angellotti | 24/297 |
| 2004/0049895 A1 * | 3/2004 | Draggoo et al. | 24/297 |
| 2004/0083583 A1 * | 5/2004 | Bradley et al. | 24/297 |
| 2006/0207068 A1 * | 9/2006 | Lepper | 24/297 |
| 2006/0242802 A1 * | 11/2006 | Scroggie | 24/297 |
| 2007/0107174 A1 * | 5/2007 | Bordas | 24/664 |
| 2007/0166127 A1 * | 7/2007 | Scroggie et al. | 411/508 |
| 2008/0181745 A1 * | 7/2008 | Naik et al. | 411/107 |
| 2008/0260454 A1 * | 10/2008 | Girodo et al. | 403/11 |
| 2008/0286067 A1 * | 11/2008 | Swayne | 411/182 |
| 2011/0035909 A1 * | 2/2011 | Moberg | 24/289 |

* cited by examiner

Prior Art

STRUCTURE OF INSTALLATION MEMBER TO BE INSTALLED TO VEHICLE OUTER PANEL, AND BOLT RETAINING MEMBER AND ATTACHMENT USED THEREFOR

RELATED APPLICATIONS

This application claims the priority of Japanese Patent Application No. 2012-084834 filed on Apr. 3, 2012, which was granted on Sep. 7, 2012 with U.S. Pat. No. 5,080,700. The disclosure of the prior application is hereby incorporated herein in the entirety by reference.

BACKGROUND OF THE INVENTION

1. Field of the Invention

This invention relates to a structure of an installation member to be installed to a vehicle outer panel, and a bolt retaining member and an attachment used therefor.

2. Background Art

As a structure of an installation member to be installed to a vehicle outer panel, the one in which a garnish (installation member) is installed to the outer panel of a vehicle by using a bolt is known (see, for example, the following patent document 1). In the installation structure, as shown in, for example, FIGS. 7 and 8, in many cases, a bolt retaining portion 110 is formed integrally with a garnish 100 so that the garnish 100 may be installed to the outer panel 130 by using a bolt 120 incorporated in the bolt retaining portion 110. On surfaces of the bolt retaining portion 110 and the bolt 120, a chrome or chromate plating film is formed to improve weather resistance and antirust effects so that the respective metallic plating films of the bolt retaining portion 110 and the bolt 120 may be in direct contact with each other. Therefore, in some cases, owing to the local cell action or the like due to a difference in ionization tendency of the plating metal, rust may develop on the bolt 120 and spread to the outer panel 130. To prevent the development of such rust, in the process of plating the garnish 100, an outer side surface 111, an insertion surface 112, and an inner side surface 113 of the bolt retaining portion 110 which come in contact with the bolt 120 are coated with a resist to make those surfaces 111 to 113 non-conductive, i.e., insulate them.

Description of the Related Art

[Patent Document 1] JP-A 2011-251591

SUMMARY OF THE INVENTION

Problem to Be Solved by the Invention

However, the process of coating the surfaces 111 to 113 of the bolt retaining portion 110 with the resist needs to be performed manually by a worker and hence is costly. Further, troubles often occur because of variations in work, especially, difficulties in work on the inner side surface 113 of the bolt retaining portion 110. There is another problem that during the resist coating processing, plating liquid in a plating bath is contaminated easily, resultantly disfiguring a site where a metallic plating film is formed.

The invention has been developed to solve the problems, and it is an object of the invention to provide a structure of an installation member to be installed to a vehicle outer panel, and a bolt retaining member and an attachment used for it that can prevent rust from developing on the bolt and the outer panel without requiring the resist coating processing.

Means for Solving Problems and Effects of the Invention

To this end, a structure of an installation member to be installed to a vehicle outer panel according to the invention includes: a metallic retaining portion provided to the installation member to be installed to the vehicle outer panel in order to install this member to this outer panel; a resin-made attachment to be attached to the retaining portion and having no metallic plating film; and a bolt whose head portion is retained by the attachment, wherein:

the bolt is incorporated integrally to the retaining portion via the attachment so that the installation member may be installed to the outer panel by this bolt; and the head portion of the bolt comes into sliding engagement with the attachment so that the head portion of this bolt and this attachment cannot relatively rotate around an axial line of this bolt. In this case, a configuration may be possible in which the attachment comes into sliding engagement with the retaining portion so that this attachment and this retaining portion cannot relatively rotate around the axis line of the bolt.

To this end, a bolt retaining member of the invention includes:

a metallic retaining portion provided to an installation member to be installed to a vehicle outer panel in order to install it to this outer panel, and an attachment which is formed of a resin product having no metallic plating film, is to be attached to the retaining portion, and can come into sliding engagement with a head portion of a bolt configured to fasten the installation member to the outer panel so that the bolt may be retained such that the head portion of this bolt cannot relatively rotate around an axis line of this bolt in condition where the head portion of this bolt is in the sliding engagement.

To this end, an attachment of the invention includes:

a resin product having no metallic plating film and interposed between a metallic retaining portion provided to an installation member to be installed to a vehicle outer panel in order to install it to this outer panel and a bolt configured to fasten the retaining member to the outer panel, wherein this attachment can be attached to the retaining portion and come into sliding engagement with a head portion of the bolt in order to retain the bolt in a manner as to disable the head portion of this bolt to relatively rotate around an axis line of this bolt in condition where the head portion of this bolt is in the sliding engagement.

Here, the "metallic" retaining portion may imply a retaining portion made of metal as well as, for example, a resin-made retaining portion on which a metallic plating film is formed.

In the structure of an installation member to be installed to a vehicle outer panel according to the invention, a bolt is incorporated integrally to a retaining portion via an attachment, so that the installation member is installed to the outer panel by this bolt. Therefore, in this structure, the bolt and the retaining portion are not in direct contact with each other to ensure insulation between the bolt and the retaining portion, so that it is possible to prevent rust from developing on the bolt and the outer panel without performing the conventional resist coating processing.

Figure 7:
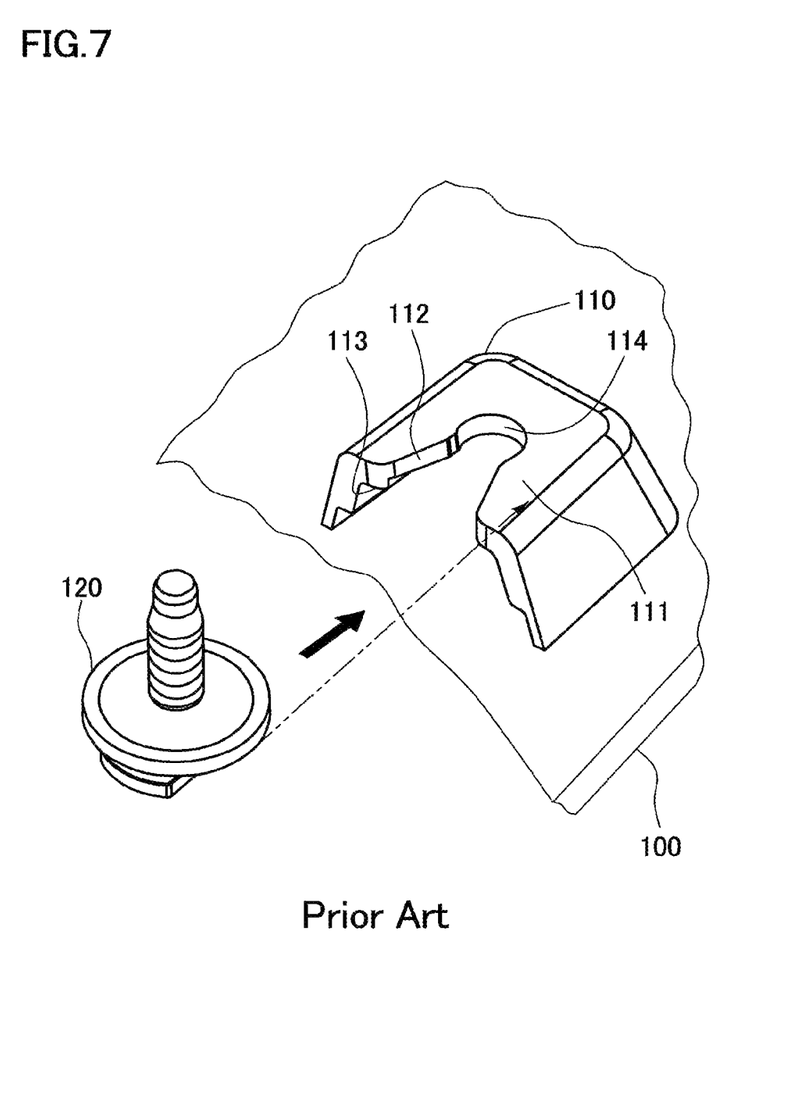
FIG. 7 is a perspective view showing a bolt retaining portion of a garnish and a bolt as well as a direction in which the bolt is installed according to a conventional technology.
Figure 8:
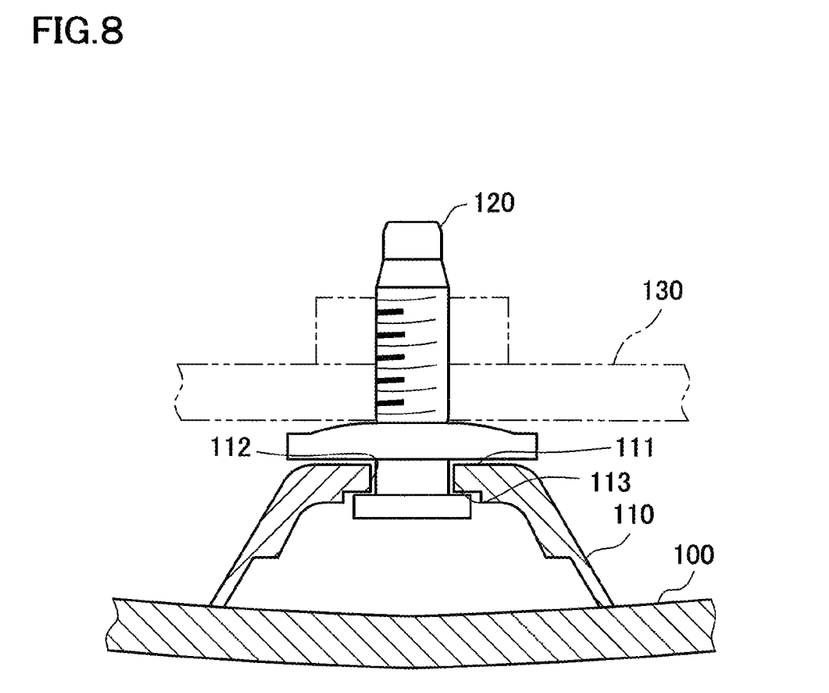
FIG. 8 is a cross-sectional front view showing a state where the retaining portion of the garnish shown in FIG. 7 is installed to a vehicle outer panel by using the bolt.

A conventional installation structure as shown in FIGS. 7 and 8 in which the bolt 120 is directly incorporated to the bolt retaining portion 110 has a problem that if the thickness of a metallic plating film formed on the insertion surface 112 of the bolt retaining portion 110 is too large, the bolt 120 cannot be inserted to a bolt loading portion 114, and hence the insertion performance of the bolt 120 is deteriorated. It has been extremely difficult to address this problem partly due to variations in thickness of the metallic plating film during a plating process. To solve the problem, the structure of the invention in which the bolt is incorporated integrally to the retaining portion via the attachment can be employed so that elastic deformation of the attachment may absorb variations in thickness of the metallic plating film, thereby giving good attachment performance of the attachment to the retaining portion irrespective of the variations in thickness of the metallic plating film.

MODE FOR CARRYING OUT THE INVENTION

The following will describe embodiments of the invention with reference to the drawings.

First Embodiment

Figure 1:
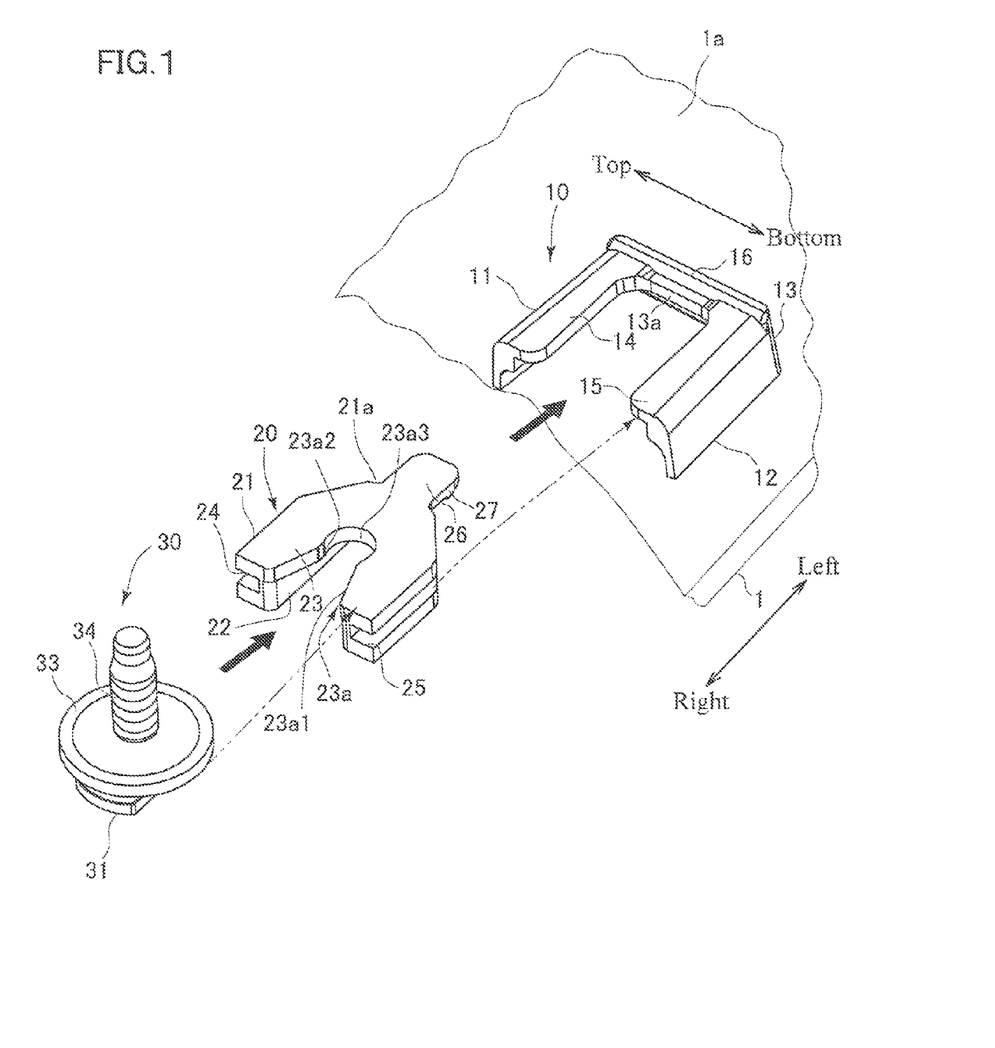
FIG. 1 is a perspective view showing a retaining portion of a garnish, an attachment, and a bolt as well as directions in which those members are installed according to a first embodiment of the invention.
Figure 2:
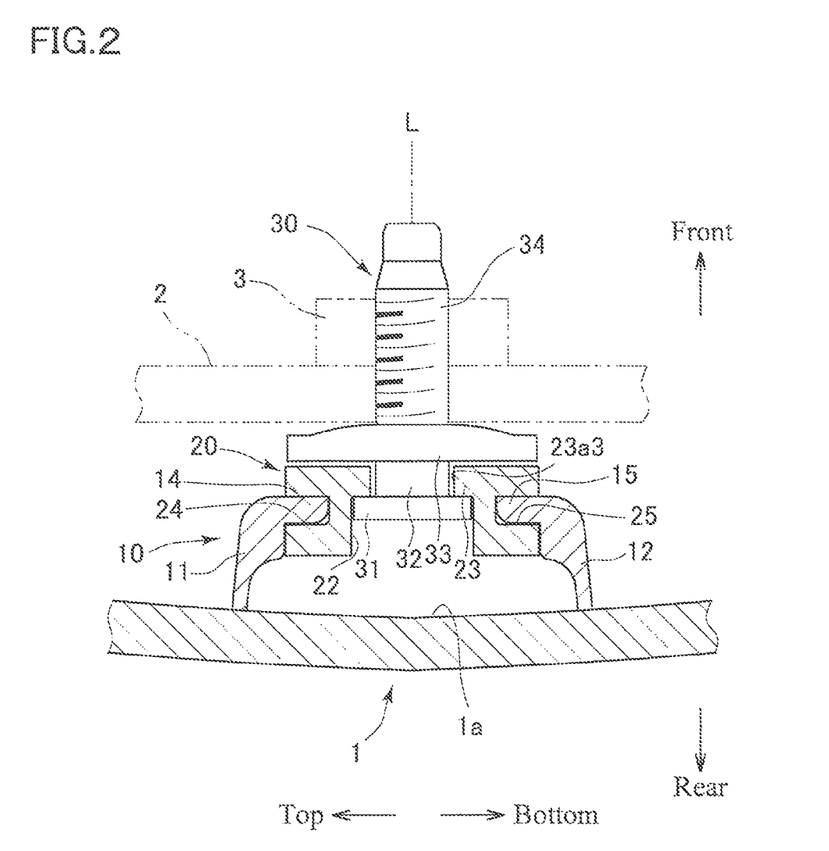
FIG. 2 is a cross-sectional front view showing a state in which the retaining portion of the garnish shown in FIG. 1 is installed to a vehicle outer panel by using the attachment and the bolt.
Figure 3:
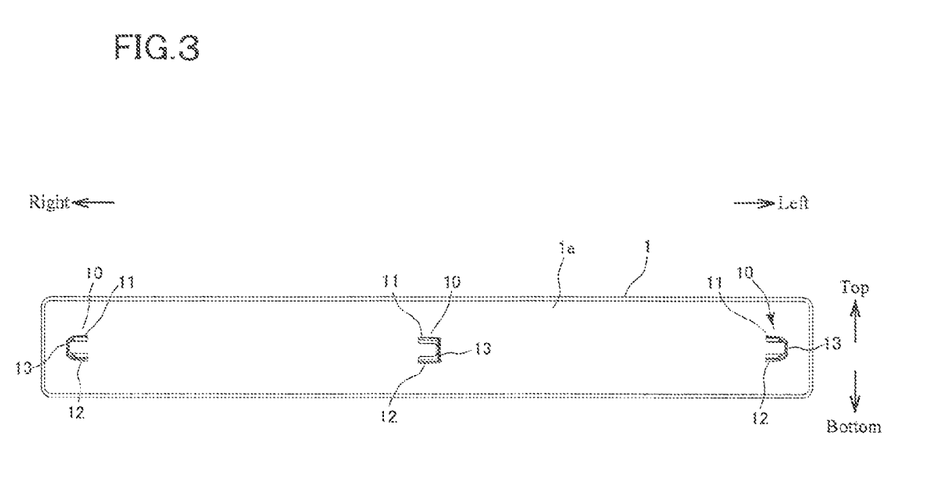
FIG. 3 is a back view of the garnish.

FIGS. 1 to 3 illustrate a rear garnish 1 to be mounted externally to the back door of a vehicle as an installation member in a structure of the installation member to be installed to a vehicle outer panel according to the invention. The rear garnish 1 is installed to an outer panel 2 of the vehicle so as to extend linearly in a right-and-left direction (width direction) of the vehicle, its outer side surface (front side) may face the rear of the vehicle, and its inner side surface (back surface) may face the front of the vehicle.

In the first embodiment, the rear garnish 1 is configured to be installed to the outer panel 2 of the vehicle via its retaining portion 10, an attachment 20, and a bolt 30.

As shown in FIG. 3, the retaining portion 10 is formed integrally with a base surface (bottom surface) 1a of the rear garnish 1 and disposed at a predetermined interval along its longitudinal direction. Each of the retaining portions 10 is formed like a case which opens on the front side and one of the right and left sides of the vehicle and has, for example, a chrome plating film formed on it in order to obtain decoration effects, weather resistance, and antirust effects.

As shown in FIGS. 1 and 3, the retaining portion 10 includes an upper wall 11 and a lower wall 12 which are disposed parallel with each other at upper and lower positions in the figure and erected on a base surface 1a so as to extend in the right-and-left direction of the vehicle and a coupling wall 13 which is erected on the base surface 1a so as to couple one end side of the upper wall 11 and one end side of the lower wall 12 and extend in a vertical direction of the vehicle. At the edges, the upper wall 11 and the lower wall 12 have engagement walls 14 and 15 formed integrally with them and extending in downward and upward directions of the vehicle so as to approach each other, respectively.

On the top of the coupling wall 13, a locking portion 16 which swells in an arc shape so as to project from the engagement walls 14 and 15 by a predetermined height (see FIG. 5) is integrally formed. The locking portion 16 will be described later.

Figure 4A:
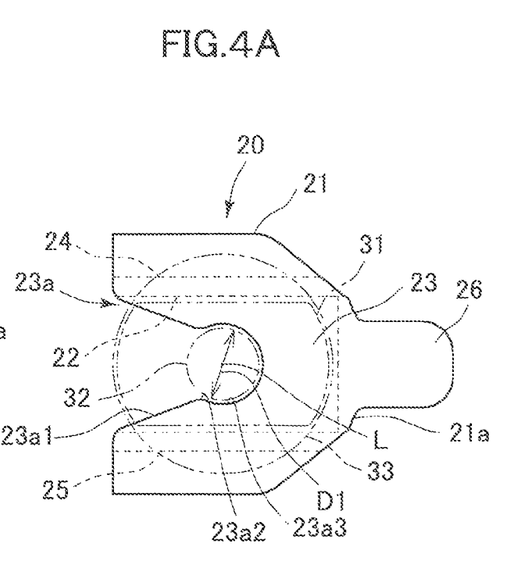
FIG. 4A is a plan view of the attachment.
Figure 4B:
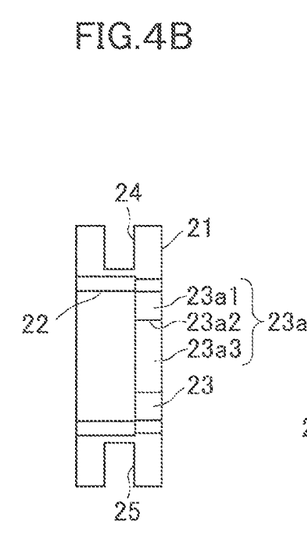
FIG. 4B is a front view of the attachment.
Figure 4C:
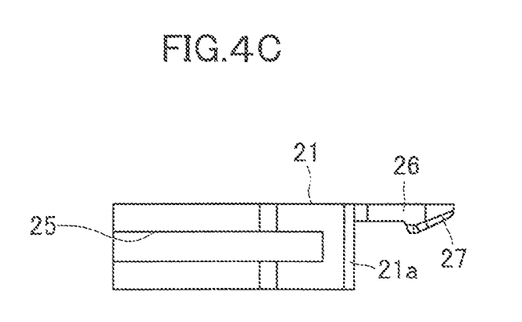
FIG. 4C is a side view of the attachment.

The bolt 30 is used to fasten the rear garnish 1 to the outer panel 2 of the vehicle and, as shown in FIGS. 1, 2, and 4, includes a bolt head portion 31 (see a two-dots-and-dash line in FIG. 4A) which is formed roughly like a rectangle or oval when seen in plan view, a flange portion 33 (see another two-dots-and-dash line in FIG. 4A) which is disposed so as to face the bolt head portion 31 via a cylinder-shaped shaft portion 32 and shaped like a disk having roughly the same diameter as the length of the bolt head portion 31 in its longitudinal direction, and a screw portion 34 which extends from the flange portion 33 as its base end side.

The bolt 30 is installed to the outer panel 2 by inserting the screw portion 34 into a through hole formed in the outer panel 2 and fastening a nut 3 to the screw portion 34 via the outer panel 2. On the bolt 30, for example, a chromate plating film is applied to give weather resistance, antirust effects, or the like.

The attachment 20 is a block body which is made of, for example, ABS resin, is shaped roughly like Y-letter when seen in plan view as shown in FIGS. 1, 2, and 4A-4C, makes the bolt 30 attachable/detachable, and is attachable to and detachable from the retaining portion 10. The attachment 20 is handled as a resin-made single item having no metallic plating film applied on it. The retaining portion 10 and the attachment 20 are combined to function as a member to retain the bolt 30.

As shown in FIG. 4A, in the attachment 20, a body 21 whose body is formed of a site ranging from the tip portions to the base end portion of a "Y-letter" fork site, a rectangular concave portion 22 is formed which can contain the bolt head portion 31 of the bolt 30 and is slightly larger than this bolt head portion 31 when seen in plan view. In condition where the bolt head portion 31 is contained in the concave portion 22, the bolt head portion 31 and the attachment 20 are disabled to relatively rotate around an axis line L of the bolt 30. The body 21 of the attachment 20 is formed to have a size which can roughly enclose the flange portion 33 of the bolt 30 in a visible outline of itself when seen in plan view.

On the body 21 of the attachment 20, an installation wall 23 is formed which is configured to cover the peripheral upper site of the concave portion 22 and has an opening 23a. The installation wall 23 is sandwiched by the bolt head portion 31 and the flange portion 33 in order to prevent the bolt head portion 31 from being pulled out of the concave portion 22 in the direction of the axis line L.

The opening 23a is formed by cutting off the tip of the "Y-letter" shaped fork site. Specifically, the opening 23a includes a taper-shaped shaft introduction portion 23a1 which tapers toward the midsection of the body 21, a shaft retaining portion 23a2 which is formed to be contiguous to the edge of the shaft introduction portion 23a1 and has a distance slightly smaller than a diameter D1 of the shaft portion 32, and a an arc-shaped shaft containment hole portion 23a3 which is formed to be contiguous to the edge of the shaft retaining portion 23a2 and has a diameter slightly larger than the diameter D1 of the shaft portion 32.

Accordingly, if the bolt head portion 31 is slid and attached in the concave portion 22, the shaft portion 32 travels up to the shaft containment hole portion 23a3 via the shaft introduction portion 23a1 and the shaft retaining portion 23a2 in this order. In this case, to move the shaft portion 32 up to the shaft containment hole portion 23a3 from the shaft retaining portion 23a2, it is necessary to apply at least a predetermined magnitude of pressure force on the bolt 30 in a direction perpendicular to its axis line L.

Further, engagement grooves 24 and 25 are formed in the outer side portion of the "Y-letter" fork site of the body 21 of the attachment 20 so that the engagement walls 14 and 15 of the retaining portion 10 can come into sliding engagement with those grooves respectively. In condition where the body 21 is in sliding engagement with the retaining portion 10, the attachment 20 and the retaining portion 10 cannot relatively rotate around the axis line L of the bolt 30.

In the configuration of the attachment 20, a straight site projecting linearly from the base end portion of the "Y-letter" provides a cantilever beam portion 26. The beam portion 26 has a cross-sectionally triangular to-be-locked portion 27 formed at its tip position corresponding to the locking portion 16 of the retaining portion 10. The beam portion 26 is shaped like a plate having a predetermined thickness and can be displaced elastically in the thickness direction of the body 21 around the coupling end of the body 21 as a supporting point.

Figure 5:
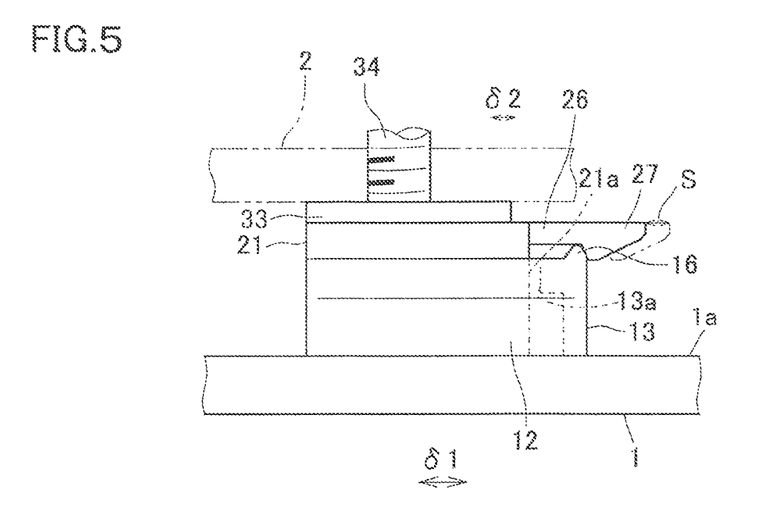
FIG. 5 is an explanatory view showing that the attachment can be moved with respect to the retaining portion further by a small stroke in condition where a retainer for the attachment to the retaining portion is held unremoved.

Owing to elastic displacement of the beam portion 26, the to-be-locked portion 27 can get over the locking portion 16 of the retaining portion 10. If the to-be-locked portion 27 is locked by the locking portion 16, the attachment 20 is retained by the retaining portion 10. However, even in the retainment state, as shown in FIG. 5, the positional relationship between a shoulder portion 21a of the body 21 and a step 13a of the coupling wall 13 which can come in contact with the shoulder portion 21a is preset so that the attachment 20 can further move relatively to the retaining portion 10 by a small stroke S.

If it is here assumed that right-and-left directional elongation of the rear garnish 1 owing to thermal expansion is $\delta 1$ and, similarly, the right-and-left directional elongation of the outer panel 2 owing to thermal expansion is $\delta 2$, the small stroke S can be given by the following equation (1).

$$S \geq \delta 1 - \delta 2 \qquad \text{Equation (1)}$$

Next, a description will be given of a process of installing the rear garnish 1 to the outer panel 2 by using the attachment 20 having the above configuration, the bolt 30, and the retaining portion 10 of the rear garnish 1.

First, the bolt 30 is installed to the attachment 20 (see FIG. 1). Specifically, the bolt head portion 31 comes into sliding engagement in the concave portion 22. By causing the shaft portion 32 to come into sliding engagement from the shaft introduction portion 23a1 up to the shaft containment hole portion 23a3 via the shaft retaining portion 23a2, the bolt 30 is positioned with respect to the attachment 20 (see FIG. 2).

Next, the attachment 20 to which the bolt 30 is attached is installed to the retaining portion 10. Specifically, the body 21 is caused to come into sliding engagement with the retaining portion 10 and move until the to-be-locked portion 27 of the beam 26 may get over the locking portion 16 of the coupling wall 13 (see FIG. 5). If the to-be-locked portion 27 gets over the locking portion 16, a feeling of moderation tells that the to-be-locked portion 27 is locked by the locking portion 16. If the to-be-locked portion 27 is locked by the locking portion 16, the attachment 20 is retained by the retaining portion 10.

Finally, the bolt 30 integrally incorporated to the retaining portion 10 via the attachment 20 is inserted into the through hole in the outer panel 2 and the nut 3 is fastened to the screw portion 34 (see FIG. 2). By this work, the rear garnish 1 can be installed to the outer panel 2.

Instead of performing the above installation process, it is also possible to cause the attachment 20 to come into sliding engagement with the retaining portion 10 to form a bolt retaining member and then attach the bolt 30 to this bolt retaining member in a sliding manner.

As may be clear from the above description, in the first embodiment, the bolt 30 is integrally incorporated to the retaining portion 10 via the attachment 20 and the rear garnish 1 is installed to the outer panel 2 by using the bolt 30. Accordingly, in this configuration, the bolt 30 and the retaining portion 10 are not in direct contact with each other to secure insulation between the bolt 30 and the retaining portion 10, so that it is possible to prevent rust from developing on the bolt 30 and the outer panel 2 without performing the conventional resist coating processing. Further, the attachment 20 can be easily formed of common installation members irrespective of their types and configured inexpensively.

Further, in the first embodiment, elastic deformation of the attachment 20 can absorb variations in thickness of the metallic plating film on the retaining portion 10. Therefore, by simply securing precision of the attachment 20, good attachment performance of the attachment 20 to the retaining portion 10 can be obtained irrespective of the variations in thickness of the metallic plating film. Consequently, even with different specifications of plating and application for the retaining portion 10, workability in attachment can be stabilized.

Further, in the first embodiment, in condition where the bolt 30 is in sliding engagement with the attachment 20, the bolt head portion 31 and the attachment 20 cannot relatively rotate around the axis line L of the bolt 30; and in condition where the attachment 20 is in sliding engagement with the retaining portion 10, the attachment 20 and the retaining portion 10 cannot relatively rotate around the axis line L of the bolt 30. Accordingly, in condition where the bolt 30 is integrally incorporated to the retaining portion 10 via the attachment 20, the rear garnish 1 and the bolt 30 are combined as an integral installation member, thereby improving workability in installation of the rear garnish 1 to the outer panel 2.

Further, in the first embodiment, if the attachment 20 comes into sliding engagement with the retaining portion 10 and the to-be-locked portion 27 of the attachment 20 gets over the locking portion 16 of the retaining portion 10, it is retained. Accordingly, it is possible to simplify the work of attaching the attachment 20 to the retaining portion 10.

Further, in the first embodiment, in condition where the attachment 20 is held as retained by the retaining portion 10, the attachment 20 can further move with respect to the retaining portion 10 by the small stroke (see FIG. 5). Accordingly, even if the rear garnish 1 and the outer panel 2 are respectively elongated due to thermal expansion, the relative movement of the attachment 20 and the retaining portion 10 can absorb a difference in thermal expansion to maintain good retainment of the attachment 20 by the retaining portion 10.

Second Embodiment

In the first embodiment, the attachment 20 and the bolt 30 are respectively separate bodies and configured such that the bolt 30 is attachable and detachable but can be retained. Accordingly, effects have been obtained in that the attachment 20 and the bolt 30 can be easily disassembled in recycling; however, as shown in, for example, FIG. 6, the head (not shown) of the bolt 30 and the attachment 20 can be combined as a bolt-equipped attachment 20' which is made by, for example, insert molding.

Figure 6:
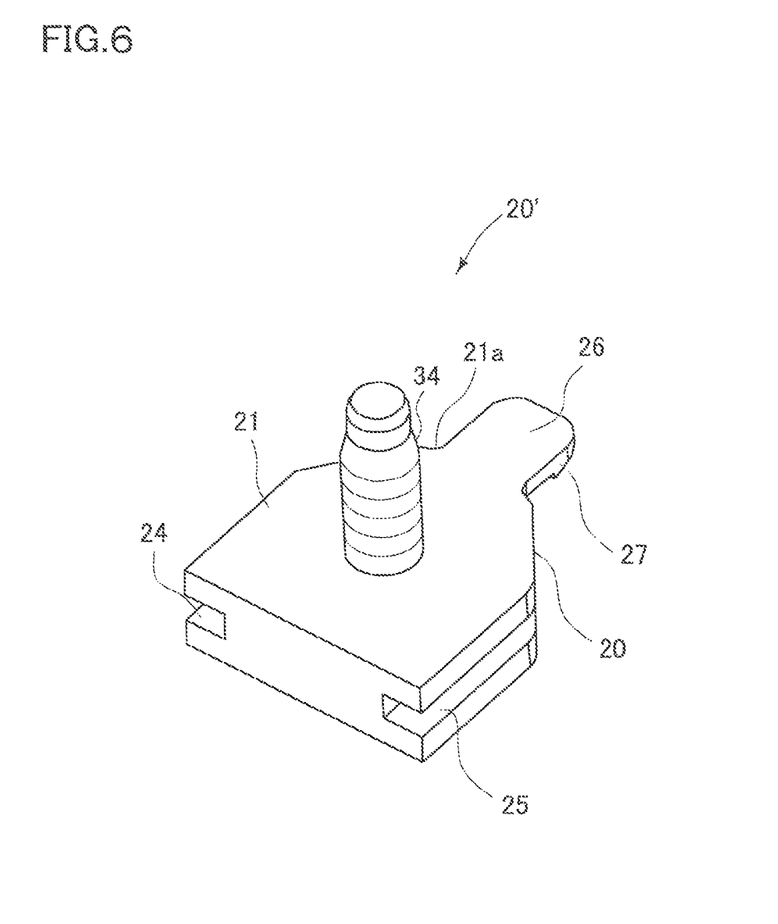
FIG. 6 is a perspective view of a case where the bolt and the attachment are formed integrally with each other according to a second embodiment of the invention.

In the bolt-equipped attachment 20', the opening 22 and the installation wall 23 are omitted from the attachment 20 in the first embodiment. The other components are the same as those in the first embodiment, and identical reference numerals are given to the identical components, and description on the identical components will be omitted.

In the second embodiment also, similar to the first embodiment, it is possible to prevent rust from developing on the bolt 30 and the outer panel 2 and also secure good performance in attachment of the bolt-equipped attachment 20' to the retaining portion 10.

Although in the first and second embodiments, the retaining portion of the invention has been configured as the resin-made retaining portion 10 having the metallic plating film formed on the surface of the installation member, the invention is not limited to it; for example, it may be configured as a retaining portion formed of, for example, metal.

In the first and second embodiments, the attachment of the invention is configured as the attachment 20 which can be attached to and detached from the retaining portion 10. This can provide effects that the retaining portion 10 and the attachment 20 can be disassembled easily; however, the invention is not limited to it, and, for example, after being attached to the retaining portion, it may be configured as an attachment which cannot be detached or is difficult to be detached from the retaining portion.

Further, although in the first and second embodiments, the bolt head 31 and the attachment 20 are disabled to relatively rotate around the axis line L of the bolt 30 and the attachment 20 and the retaining portion 10 are disabled to relatively rotate around the axis line L of the bolt 30, the invention is not limited to it; for example, the bolt head portion and the attachment may be disabled to relatively rotate around the axis line of the bolt and/or the attachment and the retaining portion may be disabled to relatively rotate around the axis line of the bolt.

Further, although in the first and second embodiments, the installation member of the invention has been configured as the rear garnish 1, the invention is not limited to it; for example, each of resin-made products to be installed to the vehicle outer panel 2 or the like may be configured as an installation member on which a metallic plating film, for example, hood mole or side mole, is applied to obtain decoration effects, weather resistance, and antirust effects.

Further, although in the first and second embodiments, to prevent the attachment 20 from being removed from the retaining portion 10, the locking structure is employed in which the to-be-locked portion 27 is provided on the side of the attachment 20 and the locking portion 16 is provided on the side of the retaining portion 10, this locking structure is one example, and the structure to lock the attachment to the retaining portion can be changed appropriately.

Further, although in the first and second embodiments, the attachment 20 is shaped like the "Y-letter", it is one example; for example, the shape may be changed appropriately to, for example, a "rectangle" or a "square". Further, the opening 23a in the first embodiment is not limited to a structure that has the shaft introduction portion 23a1, the shaft retaining portion 23a2, and the shaft containment hole portion 23a3; for example, the shape of the opening can be changed appropriately to, for example, something that has a shaft introduction portion and a shaft containment hole portion which are linear to improve the shaft retaining performance.

DESCRIPTION OF REFERENCE NUMERALS

1 Rear garnish (installation member)
2 Outer panel
10 Retaining portion (bolt retaining member)
13 Coupling wall
14, 15 Engagement wall
16 Locking portion
20 Attachment (bolt retaining member)
20' Bolt-equipped attachment
21 Body
22 Concave portion
23 Installation wall
23a Opening
23a1 Shaft introduction portion
23a2 Shaft retaining portion
23a3 Shaft containment hole portion
24, 25 Engagement groove
26 Beam portion
27 To-be-locked portion
30 Bolt
31 Bolt head portion
32 Shaft portion
33 Flange portion
34 Screw portion

What is claimed is:

1. A structure of an installation member for installation to a vehicle outer panel, the structure comprising:
    a metallic retaining portion fixed to the vehicle outer panel and having an opening;
    a resin-made attachment to be attached to the retaining portion via the opening and having no metallic plating film; and
    a bolt having a head portion that is retained by the attachment and having metallic plating film, wherein:
    the bolt is incorporated integrally to the retaining portion via the attachment, wherein the installation member is installed to the outer panel by this bolt; and
    the head portion of the bolt comes into sliding engagement with the attachment, wherein the head portion of this bolt and this attachment cannot relatively rotate around an axial line of this bolt; and
    the attachment is in sliding engagement with the retaining portion, and the attachment and this retaining portion cannot relatively rotate around an axis line of the bolt; and
    the retaining portion includes an upper wall and a lower wall, which are disposed parallel with each other at upper and lower positions and erected on a base surface so as to extend in the right-and-left direction of the outer panel and a coupling wall which is erected on the base surface coupling one end side of the upper wall and one end side of the lower wall and extend in a vertical direction of the outer panel, wherein
    the upper wall and the lower wall have each engagement wall formed integrally at each edge and extending in downward and upward directions in relation to the outer panel to approach each other, respectively, and the coupling wall has a locking portion formed on its top position projecting from the engagement walls by a predetermined height;
    wherein the attachment is generally Y-shaped, and engagement grooves are formed in outer side portion of fork portions of the attachment so that the engagement walls of the retaining portion come into sliding engagement with those grooves respectively;

a straight site projecting linearly from a base end portion of the attachment provides a cantilever beam portion and the beam portion has a to-be-locked portion formed at its tip position corresponding to the locking portion of the retaining portion;

wherein elastic displacement of the beam portion allows the to-be-locked portion to pass over the locking portion of the retaining portion; and wherein when the to-be-locked portion is locked by the locking portion, the attachment is retained by the retaining portion allowing the attachment to move in the direction of sliding engagement relatively to the retaining portion by a predetermined stroke.

* * * * *